United States Patent [19]

Sausner et al.

[11] Patent Number: 5,184,591
[45] Date of Patent: Feb. 9, 1993

[54] DEVICE FOR TEMPORARILY STORING VOLATILE FUEL CONSTITUENTS AND SUPPLYING THEM AT A CONTROLLED RATE TO THE INTAKE PIPE OF AN INTERNAL COMBUSTION ENGINE

[75] Inventors: Andreas Sausner, Frankfurt am Main; Sebastian Zabeck, Hemsbach, both of Fed. Rep. of Germany

[73] Assignee: Firma Carl Freudenberg, Weinheim, Fed. Rep. of Germany

[21] Appl. No.: 788,643

[22] Filed: Nov. 6, 1991

[30] Foreign Application Priority Data

Nov. 6, 1990 [DE] Fed. Rep. of Germany ....... 4035158

[51] Int. Cl.⁵ ............................................ F02M 33/02
[52] U.S. Cl. ................................... 123/520; 123/516; 123/518
[58] Field of Search ............... 123/198 D, 516, 518, 123/519, 520, 521, 494, 479

[56] References Cited

U.S. PATENT DOCUMENTS

| | | | |
|---|---|---|---|
| 4,630,581 | 12/1986 | Shibata | 123/519 |
| 4,641,623 | 2/1987 | Hamburg | 123/518 |
| 4,700,750 | 10/1987 | Cook | 123/518 |
| 4,748,959 | 6/1988 | Cook et al. | 123/520 |
| 4,901,702 | 2/1990 | Beicht et al. | 123/458 |
| 4,945,885 | 8/1990 | Gonze et al. | 123/520 |
| 4,949,695 | 8/1990 | Uranishi et al. | 123/520 |
| 4,953,514 | 9/1990 | Beicht et al. | 123/520 |
| 4,995,365 | 2/1991 | Denz et al. | 123/479 |
| 5,048,493 | 9/1991 | Orzel et al. | 123/520 |
| 5,054,454 | 10/1991 | Hamburg | 123/520 |
| 5,072,712 | 12/1991 | Steinbrenner et al. | 123/520 |
| 5,080,078 | 1/1992 | Hamburg | 123/519 |
| 5,085,194 | 2/1992 | Kvroda et al. | 123/198 D |
| 5,085,197 | 2/1992 | Mader et al. | 123/516 |

Primary Examiner—E. Rollins Cross
Assistant Examiner—Thomas N. Moulis
Attorney, Agent, or Firm—Sprung Horn Kramer & Woods

[57] ABSTRACT

A device for temporarily storing the volatile fuel constituents contained in the empty space (11) of a fuel tank (10) and supplying them at a controlled rate to the intake pipe (1) of an internal combustion engine (2). A shut-off valve (8) is accommodated in a line (3) that extends through a volatile fuel constituent absorber (9) to the intake pipe of the engine. A sensor (4) accommodated in the line generates a first signal representing the mass flow. An auxiliary component (6) generates a second signal quantitatively representing the valve position of the shut-off valve and compares the first and second signals. The auxiliary component has at least one accessory means (7) for displaying deviations between the first and second signals.

3 Claims, 2 Drawing Sheets

5,184,591

DEVICE FOR TEMPORARILY STORING VOLATILE FUEL CONSTITUENTS AND SUPPLYING THEM AT A CONTROLLED RATE TO THE INTAKE PIPE OF AN INTERNAL COMBUSTION ENGINE

BACKGROUND OF THE INVENTION

The present invention concerns a device for temporarily storing volatile fuel constituents and supplying them at a controlled rate to the intake pipe of an internal combustion engine, wherein a shut-off valve is accommodated in a line that extends through a volatile fuel absorber to the intake pipe of an engine.

A device of this type is known from the German Patent No. 3,802,664 and the U.S. Pat. No. 4,901,702. The device is intended to prevent the volatile fuel constituents, always present in the empty space at the top of an internal combustion engine's fuel tank, from escaping into the atmosphere. The device comprises a special venting line between this space and the atmosphere which accommodates a reservoir containing a volatile fuel absorber. The absorber usually comprises a permeable mass of activated carbon that can temporarily store a considerable volume of volatile fuel. The absorber is regenerated by forcing fresh air through it while the engine is operating normally. The device therefore also comprises a line that connects the reservoir with the engine's intake pipe. It is also known to control the mass flow through this line leading to an internal combustion engine's intake pipe by means of one or more valves. An auxiliary valve is interposed directly upstream of a shut-off valve. The auxiliary valve can be closed off by a vacuum-controlled regulator governed by the difference between the pressure in a control chamber and atmospheric pressure.

It should be emphasized that controlling the rate at which volatile constituents are supplied to the intake pipe of an internal combustion engine is of significant importance. It is a prerequisite to unrestricted exploitation of the advantages of such a device. When problems with mass flow occur in a device of this type, which device comprises many individual components, it is impossible to detect and correct them. A malfunction on the part of the device has a negative effect on the environment due to the creation of engine exhaust pollutants. Uncombusted hydrocarbons can escape into the atmosphere as a result of a defective line without being noticed by those operating the internal combustion engine. The efficiency of the engine can also be affected negatively by malfunctions on the part of the device, especially in the form of rough engine operation.

SUMMARY OF THE INVENTION

A principal object of the present invention is to improve a device of the aforesaid type by controlling the rate of flow of the mass of volatile fuel components that travel through the line into the intake pipe of an internal combustion engine. Taken in conjunction with the regulation of the various phases of operation of an internal combustion fuel to the combustion chambers accompanied by inclusion of the volatile fuel constituents, thereby considerably reducing the potential for environmental pollution by the engine.

This object, as well as other objects which will become apparent from the discussion that follows, are achieved, in accordance with the present invention, by providing (1) a sensor in the volatile fuel line that generates a signal representing the mass flow, (2) an auxiliary component that generates another signal quantitatively representing the valve position of the shut-off valve, and that compares the first and second signals; and (3) at least one accessory means of displaying discrepancies between the first and the second signal.

The device in accordance with the present invention for controlling the supply of volatile fuel constituents to the intake pipe of an internal combustion engine makes it possible to monitor and affect the mass flow of volatile fuel constituents into the intake pipe. Using the sensor with an auxiliary component, which can for example be a mechanism for activating the shut-off valve, and with accessory means of displaying irregularities in the mass flow, it is possible to detect early and to eliminate any malfunctions that may occur in the system. When the flow through the sensor and into the intake pipe deviates slightly from a reference flow that has been defined for ideal operating conditions on the part of the internal combustion engine, due to deposits in the auxiliary valve for example, the controls will, by regulating the shut-off valve, be able to vary the supply of the gas to the intake pipe. The mass flows that act as a reference for comparison with the actual mass flows of volatile fuel constituents can in a practical way be plotted in a graph associated with the auxiliary component.

The references for the mass flow into the internal combustion engine's intake pipe can constantly be compared by the auxiliary component with the actual flow by way of the signal obtained by the sensor. If the discrepancies between the two values exceed an arbitrarily prescribed tolerance, the auxiliary component will activate the shut-off valve. How rapidly the shut-off valve responds to a control signal from the auxiliary component is decisive for adaptation to the dynamic procedures within the device. The more rapidly the shut-off valve responds to a control signal from the auxiliary component, the more advantageous will be the effectiveness of the device in relation to exhaust emissions and the efficiency of the internal combustion engine. When discrepancies between the reference and actual values for the mass flow can no longer be compensated, this situation can be determined from the accessory which provides the display.

According to a preferred feature of the invention, the sensor is upstream of the absorber and the shut-off valve. The advantage is that the sensor is easily accessible and is not near the intake pipe. If any defect in the form of a leaking or disconnected hose occurs at any point in the device, the volatile mass flowing through the sensor will decrease. The resulting discrepancy between the actual and reference values will be detected by the auxiliary component and, if the discrepancy cannot be corrected, displayed on the display.

According to another preferred feature of the invention, the sensor can transmit a signal to the shut-off valve to activate it by way of the auxiliary component. The shut-off valve continuously transmits a signal to the auxiliary component as long as the internal combustion engine is in operation. The signal from the sensor activates the shut-off valve by way of an auxiliary component, for example in the form of a control device.

According to still another preferred feature of the present invention, the auxiliary component can accommodate means of suppressing the display of discrepancies which are less than an arbitrarily prescribed threshold. The accessory means, which can be a display for example, will accordingly provide the information only in the event of critical discrepancies between the reference value and the actual value of the mass flowing through the line into the internal combustion engine's intake pipe. This approach provides a better overview in monitoring the device's operation and makes it easier to control.

The preferred embodiments of the present invention will now be described with reference to the accompanying drawing.

DESCRIPTION OF THE PREFERRED EMBODIMENT

Figure 1:
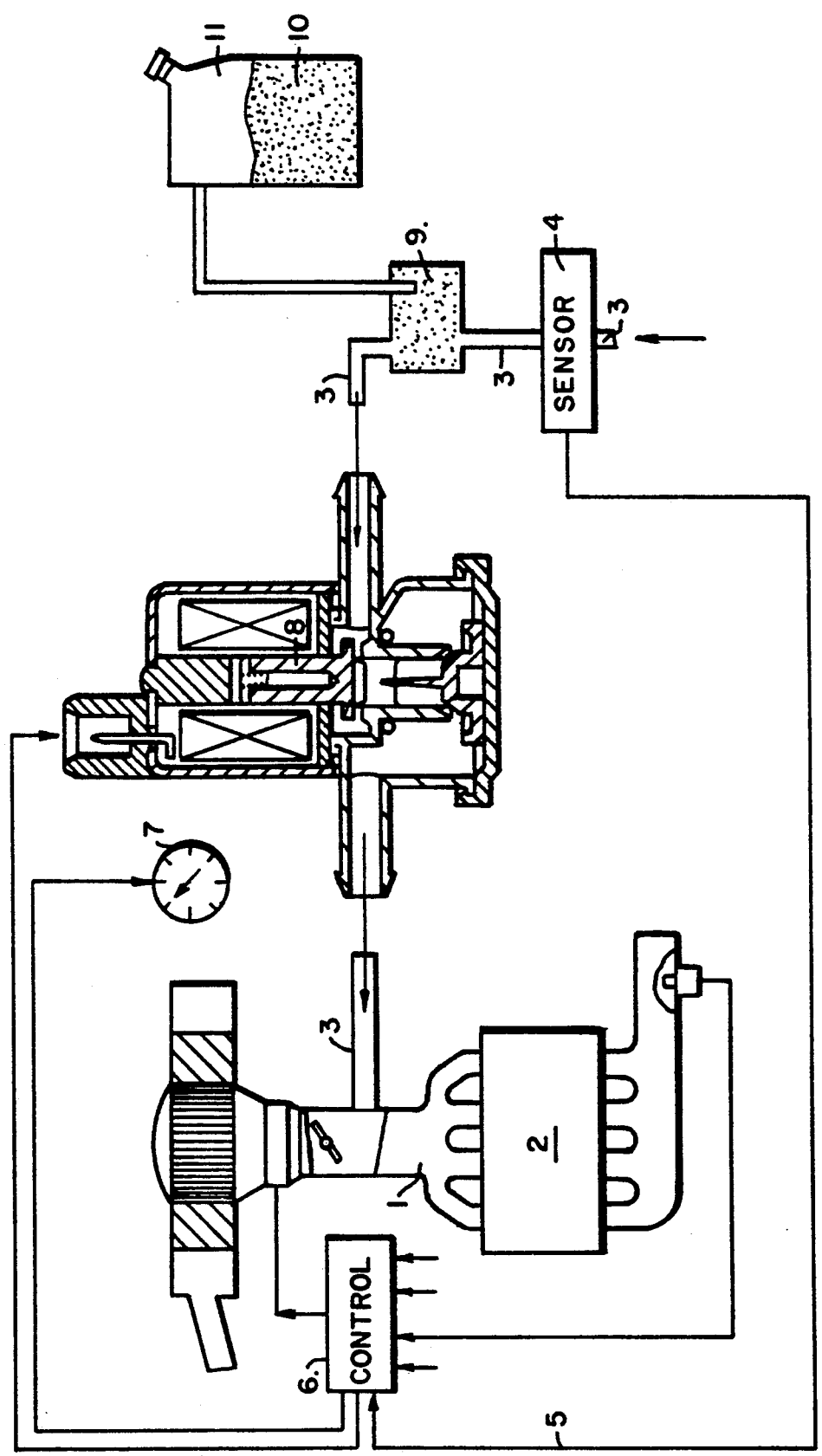
FIG. 1 is a partially diagrammatic representation of a system for supplying volatile fuel constituents to the intake pipe of an internal combustion engine in accordance with the preferred embodiment of the invention.

A device for supplying volatile fuel constituents to the intake pipe of an internal combustion engine at a controlled rate operates as described in the aforementioned German Patent No. 3,802,664 and U.S. Pat. No. 4,901,702, for example.

In addition to the components described in that patent, a sensor 4 is positioned upstream of an absorber 9 containing granulated active carbon and a shut-off valve 8. Sensor 4 communicates by way of a signal line 5 with an auxiliary component 6 in the form of an electronic control unit and supplies it with a signal representing the actual state of mass flow. A graph of the mass-flow reference parameters can be stored in the control unit 6. Once a discrepancy between the actual and reference values has attained a certain magnitude, this discrepancy is displayed on an accessor means 7. Meanwhile, the control unit 6 activates a shut-off valve 8 in an attempt to make the two values coincide. If this attempt is successful, the display on accessory means 7 is removed. The control unit 6 can also accommodate additional means that will not allow shut-off valve 8 to be activated and a display to be indicated on accessory means 7 until a prescribed interval of time has elapsed subsequent to the occurrence of the discrepancy. This arrangement provides time for minor irregularities in the device, or operations already carried out in relation to shut-off valve 8, to stabilize.

Figure 2:
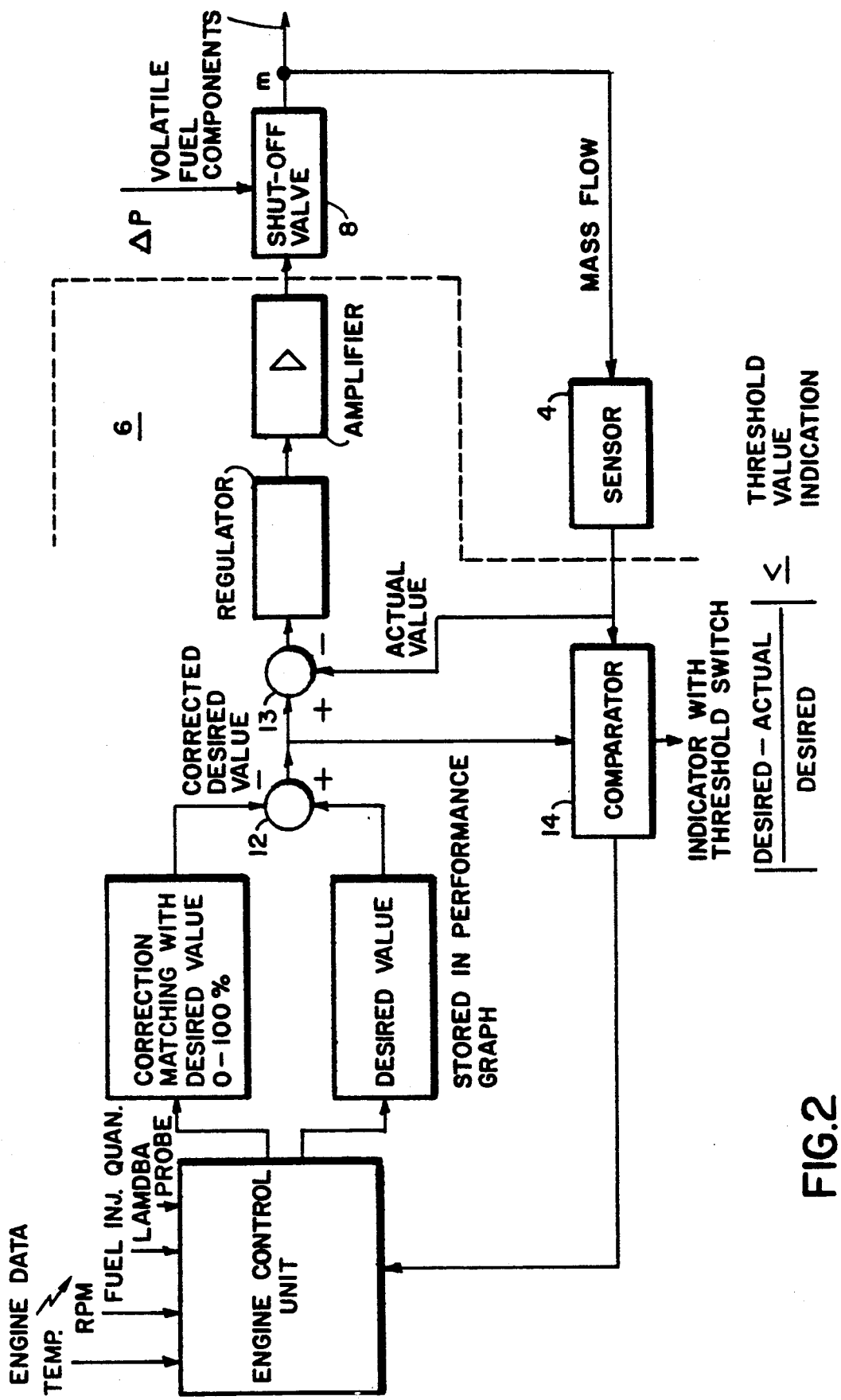
FIG. 2 is a block diagram of the electronic control unit employed in the system of FIG. 1.

FIG. 2 illustrates the structure and operation of the auxiliary component or engine control unit 6. This unit includes a conventional engine control which receives various temperatures, the engine RPM, the injected fuel quantity and/or values from the lamda probe as inputs. The output values of the engine control include the desired value, which can be stored in the performance graph of the engine control unit, and a correction value which influences the desired value. The correction unit shown in FIG. 2 is, in actuality, a part of the engine control unit. Its purpose is to adjust the desired value stored in the performance graph in dependence upon the input data that reflect the operating condition of the engine, for example the engine RPM, and various temperatures measured at different points.

The corrected value is subtracted from the desired value at a node 12 to produce a corrected desired value. This corrected value is supplied to a subtraction node 13 which also receives the actual value from the sensor 4. The corrected desired value is also supplied to a comparator 14 which causes the accessory means 7 to display a discrepancy when a prescribed threshold value is exceeded.

Simultaneously, the difference between the actual and the corrected desired value are passed through a regulator and amplifier to actuate the shut-off valve 8.

The engine data, which are shown as input signals to the engine control unit in FIG. 2, are received as actual values, are stored in the engine control and compared with the fixed desired value stored in the performance graph by means of at least one comparator (included in the engine control and therefore not separately shown in FIG. 2). Deviations from the desired value may be caused by lamda deviations (for example, a too-rich mixture), by strongly varying ambient temperatures or other by external influences. If the actual values do not correspond to the desired values which are stored in the performance graph, the correction comes into play and influences the fixed desired value. This corrected desired value forms the output signal of the subtraction node 12 which is compared with the actual value of the mass flow through the shut-off valve 8.

There has thus been shown and described a novel device for supplying volatile fuel components at a controlled rate to the intake pipe of an internal combustion engine which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention, which is to be limited only by the claims which follow.

What is claimed is:

1. In an apparatus for temporarily storing volatile fuel constituents and supplying them at a controlled rate to the intake pipe of an internal combustion engine, said device comprising a volatile fuel constituent absorber, a gas line extending through the absorber to the intake pipe of the engine and a shut-off valve arranged in the gas line, the improvement comprising sensor means arranged in the gas line for producing a first signal representing the volatile constituent mass flow; an auxiliary component, responsive to said first signal, for controlling the position of the shut-off valve and producing a second signal representing the position of the shut-off valve, the auxiliary component including means for comparing the first and second signals; and at least one accessory means for displaying deviations of the first signal with respect to the second signal which exceed an arbitrarily prescribed threshold.

2. The apparatus defined in claim 1, wherein the sensor means is disposed upstream of the absorber and the shut-off valve.

3. The apparatus defined in claim 1, wherein the auxiliary component includes means for suppressing the display of deviations which are less than a prescribed threshold.

* * * * *